T. W. WALKER.
SOLAR HEATER.
APPLICATION FILED FEB. 20, 1912.
1,056,861.
Patented Mar. 25, 1913.
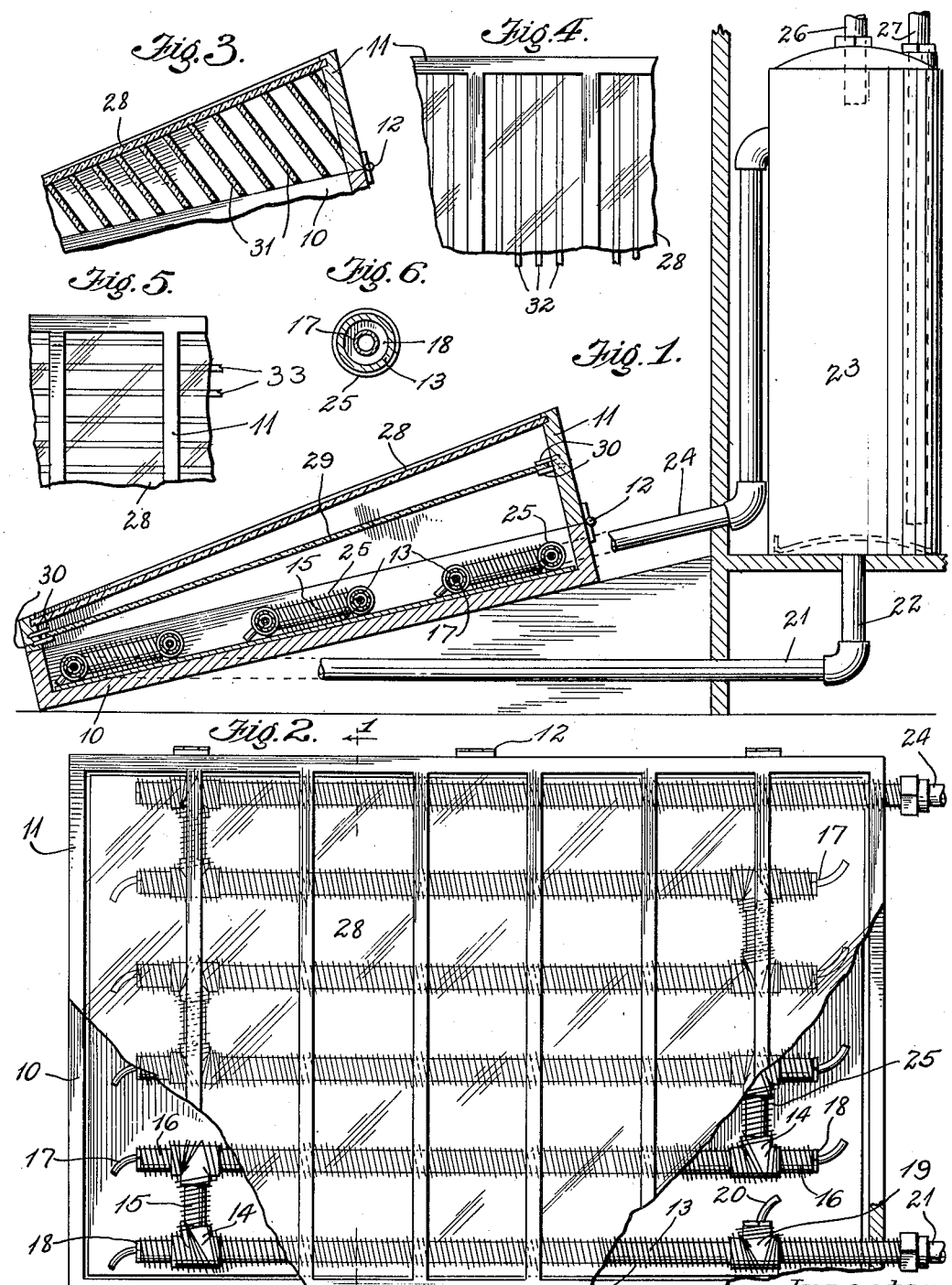

UNITED STATES PATENT OFFICE.

THOMAS W. WALKER, OF MONROVIA, CALIFORNIA.

SOLAR HEATER.

1,056,861.  Specification of Letters Patent.  Patented Mar. 25, 1913.

Application filed February 20, 1912. Serial No. 678,800.

*To all whom it may concern:*

Be it known that I, THOMAS W. WALKER, a citizen of Great Britain, residing at Monrovia, in the county of Los Angeles and State of California, have invented new and useful Improvements in Solar Heaters, of which the following is a specification.

This invention relates to improvements in solar heaters and particularly to such as are designed to be exposed to the sun's rays whereby heat absorbed therefrom will heat or increase the temperature of water passed through the mechanism.

It is an object of the invention to provide a solar heater with piping through which the water to be heated is circulated, the said piping having air conducting members extending through the same, whereby the water will be more quickly and thoroughly heated.

It is a further object of the invention to provide a solar heater with piping wrapped with heat absorbing material, the said heater being also provided with reflecting glass plates, arranged in a suitable manner for directing the sun's rays against the water tubes in the most effective manner.

In the accompanying drawing forming a part of this specification, Figure 1 is a vertical transverse sectional view through a heater constructed in accordance with the present invention, the usual tank employed in connection with the same being shown in elevation, the section being taken upon the line 1—1 of Fig. 2. Fig. 2 is a top plan view of the heater, a portion of the framing being broken away to show the arrangement of the water piping. Fig. 3 is a fragmentary sectional view taken transversely of the heater, showing inclined reflecting plates arranged in the upper portion thereof. Fig. 4 is a top plan view of a portion of the heater showing heat directing plates arranged transversely thereof. Fig. 5 is a similar detail view showing the plates arranged longitudinally of the heater. Fig. 6 is an enlarged transverse sectional view of one of the pipes employed, showing the wrapping thereon and the hollow core within it.

The details and features of the invention will now be more particularly described, reference being had to the said drawing in which 10 indicates the bottom casing of a heater constructed in accordance with this invention, 11 an upper or covering frame therefor which is usually pivoted at 12 to the casing 10. The said casing may be located at any desired point where it can be struck by the sun's rays, as for instance upon the roof of a building or structure or any other desired place.

The heater is usually slightly inclined toward the sun to better receive its direct rays. Within the casing 10 is arranged the water piping for directing the water to be heated, the said water piping being made up of a series of longitudinally extending pipes 13, which are connected by means of couplings 14 and transverse connecting pipes 15 with each other, such connections being arranged alternately at the opposite ends of the heater as shown in Fig. 2. The said couplings also carry short end sections 16, which project beyond them and facilitate the positioning and holding of the hollow cores employed within the piping. Extending through the piping from end to end are similar pipes forming hollow cores 17 which are generally curved downwardly at one end and upwardly at the other as shown in Fig. 2 of the drawing. These hollow cores are open at the ends so that air may circulate through the same within the casing of the heater. The ends of the short sections 16 which project from the couplings are provided with stopping ring blocks 18 which close the space between the piping and the hollow core and also serve to hold said hollow cores in central position within the piping which carries the water. The stopping ring blocks 18 also prevent the leakage of water around the ends of said hollow cores.

The lower pipe 13 in the lower portion of the casing is preferably connected with an inlet pipe and a T coupling 19 may be used to couple said pipes so that the end of the hollow core which passes into the lower pipe 13 can be turned upwardly and outwardly through the said T coupling as at 20. The said inlet pipe is connected by other suitable piping 21 and 22 with the lower end of a storage tank 23. The upper pipe in the heater is connected with a return pipe 24 which extends to the upper part of the reservoir 23. In this way the water which is coolest in the tank 23, will go to the bottom and tend to pass through the piping 22, 21 and 18 into the series of pipes within the heater and upon becoming warm therein will tend to rise and pass through the piping 24 into the upper part of the heater. In this way the water will circulate through the heating pipes within the heating device. The piping within the heater is also preferably wrapped with a heat absorbing material, usually copper wire as shown at 25. The surfaces within the casing are usually painted black so as to afford as much heat absorbing surface within the heater as possible. The air within the casing of the heater is thus brought to a high temperature under the rays of the sun, so that the heat engaging the outer surface of the pipes with the absorbent wire thereon and passing through the hollow cores will thoroughly and highly heat the water passing inside the said pipes. The tank 23 is connected by means of pipes 26 and 27 with the water systems of a house in any usual or well known manner.

The cover portion 12 of the casing is provided at the top with transparent material usually one or more panes of glass as 28, which are set in the said frame 11 in any usual or ordinary manner. Below the panes 28 other pieces of glass or transparent plates may be located as indicated in the drawing, thus horizontal or inclined plates 29 may be employed and held in position more or less loosely by means of inwardly extending pins or projections 30 in the edge walls of the frame 11. It is also found advantageous at times to employ a series of inclined parallel plates of glass as 31, adapted to further collect and hold the heat from the rays of the sun within the casing of the heater. Instead of arranging the glass in inclined position, vertically arranged parallel strips of glass 32 may be used extending transversely or similar longitudinally arranged strips 33 may be used as illustrated in the detail figures of the drawing. The expanse of heat receiving glass plates thus afforded increases the efficiency of the heater and holds a greater quantity of heat within the same, for raising the temperature of the water passing through the parts therein.

What I claim is:

1. A heating device comprising a casing having a series of pipes mounted therein for exposure to the sun's rays, the said pipes being adapted to have a fluid circulated through them, and hollow cores extending through said pipes for facilitating the heating of said fluid.

2. A solar heater, comprising a series of pipes adapted to be exposed to the rays of the sun, the said pipes having wound thereon a continuous heat absorbing medium, and means for passing heated air through the said pipes.

3. A solar heater, comprising a casing having a series of parallel pipes connected near their ends for directing water through their entire lengths, the ends of said pipes being free within the said casing, hollow tubes extending through the said pipes and projecting from the ends thereof, means for closing the space between the pipes and the hollow tubes, and connecting piping leading from the pipes in the casing to a suitable reservoir.

In witness that I claim the foregoing I have hereunto subscribed my name this 7th day of February, 1912.

THOMAS W. WALKER.

Witnesses:
  E. STADLMAN,
  EARLE R. POLLARD.